(12) United States Patent
Liu et al.

(10) Patent No.: US 6,667,880 B2
(45) Date of Patent: Dec. 23, 2003

(54) FIXING APPARATUS FOR DATA STORAGE DEVICES

(75) Inventors: Yu Tai Liu, Taipei (TW); Kuo Chih Lin, Taipei (TW); Alvin Liu, Taipei (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 15 days.

(21) Appl. No.: 10/046,599

(22) Filed: Jan. 16, 2002

(65) Prior Publication Data

US 2003/0058612 A1 Mar. 27, 2003

(30) Foreign Application Priority Data

Sep. 21, 2001 (TW) .......................................... 090216169

(51) Int. Cl.[7] .............................. G06F 1/16; F47B 97/00
(52) U.S. Cl. .................... 361/685; 361/727; 312/223.2; 248/222.11; 211/26
(58) Field of Search ................................ 361/685, 683, 361/686, 724–727; 312/223.1, 23.2, 319.1, 333; 248/222.11, 298.1, 222.4; 211/26, 41, 94, 162

(56) References Cited

U.S. PATENT DOCUMENTS

| | | | | | |
|---|---|---|---|---|---|
| 5,227,954 A | * | 7/1993 | Twigg | ......................... | 361/685 |
| 5,587,879 A | * | 12/1996 | Spano et al. | ................ | 361/685 |
| 6,099,098 A | * | 8/2000 | Leong | ......................... | 312/333 |
| 6,238,026 B1 | * | 5/2001 | Adams et al. | ............ | 312/223.2 |
| 6,256,195 B1 | * | 7/2001 | Liao | ............................ | 361/685 |
| 2003/0090869 A1 | * | 5/2003 | Liu et al. | ..................... | 361/685 |

* cited by examiner

Primary Examiner—Lisa Lea-Edmonds
(74) Attorney, Agent, or Firm—Wei Te Chung

(57) ABSTRACT

A fixing apparatus (10) for storage devices (80) includes a drive bracket (20) and a fixing plate (40). The drive bracket includes a side panel (24) defining grooves (28) for slidingly receiving screws (82) that are attached on opposite sides of the storage devices. The fixing plate is attached on the side panel, and includes locking elements (44). Each locking element includes a spring portion (56), a stop wall (58), and a handle (60). To insert a storage device, the screws are slid along opposite grooves. One screw outward presses a spring portion, and causes it to be elastically deformed. When that screw has slid beyond the spring portion, the spring portion elastically returns to its original position. The stop wall and the side panel sandwich that screw therebetween. Up to three storage devices are thus secured within the drive bracket.

17 Claims, 4 Drawing Sheets

FIXING APPARATUS FOR DATA STORAGE DEVICES

BACKGROUND OF THE INVENTION

1. Field of the Invention

The present invention relates to fixing apparatuses, and particularly to fixing apparatuses that readily attach data storage devices in brackets.

2. Related Art

Various data storage devices are installed in computers for communication and handling of data. Such devices include, for example, hard disk drives, floppy disk drives, and CD-ROM drives.

A conventional data storage device is directly attached to a computer enclosure with bolts. However, attachment with bolts is unduly complicated and time-consuming.

Thus rails have been developed to mount a data storage device to a computer enclosure. Such rails are disclosed in U.S. Pat. No. 5,510,955. A drive bracket forms two pairs of leader rails on opposite sides thereof. Each pair of leader rails defines a pair of first coaxial holes. A pair of guide rails is respectively attached to opposite sides of a data storage device with bolts. Each guide rail comprises a pair of flanges defining a pair of second coaxial holes. The assembly of the storage device and the guide rails is inserted into the drive bracket by sliding the guide rails along the leader rails. A pair of locking pins is then extended through the first and second coaxial holes to thereby secure the storage device within the drive bracket. However, mounting the rails to the data storage device with bolts is unduly complicated and time-consuming. Furthermore, the drive bracket can only accommodate one storage device therein.

SUMMARY OF THE INVENTION

Accordingly, an object of the present invention is to provide a fixing apparatus which can readily attach a plurality of data storage devices within a drive bracket.

To achieve the above-mentioned object, a fixing apparatus in accordance with the present invention comprises a drive bracket for installing storage devices therein, and a fixing plate attached on one side of the drive bracket. The drive bracket comprises a bottom panel, a first side panel extending from a side edge of the bottom panel, a step extending from an opposite side edge of the bottom panel, and a second side panel extending from a free edge of the step. The first side panel defines a plurality of grooves for slidingly receiving screws that are attached on opposite sides of the storage devices. The step and the second side panel define a plurality of grooves corresponding to the grooves of the first side panel. The fixing plate has a plurality of locking elements corresponding to the grooves of the drive bracket. Each locking element comprises a spring portion, a stop wall, and a handle. To insert a storage device, the screws are slid along opposite grooves. One screw outwardly presses a spring portion, and causes the spring portion to be elastically deformed. When that screw has slid beyond the spring portion, the spring portion elastically returns to its original position. The stop wall and the first side panel sandwich that screw therebetween. Three storage devices can be respectively supported on the support tabs, the step, and the bottom panel. Up to three storage devices are thus secured within the drive bracket. To remove a storage device, the handle is pulled outwardly. The screw is therefore released from the stop wall. The storage device is then readily slid out from the drive bracket.

Other objects, advantages and novel features of the present invention will be drawn from the following detailed description of preferred embodiments of the present invention with attached drawings, in which:

DESCRIPTION OF THE PREFERRED EMBODIMENTS

Figure 1:
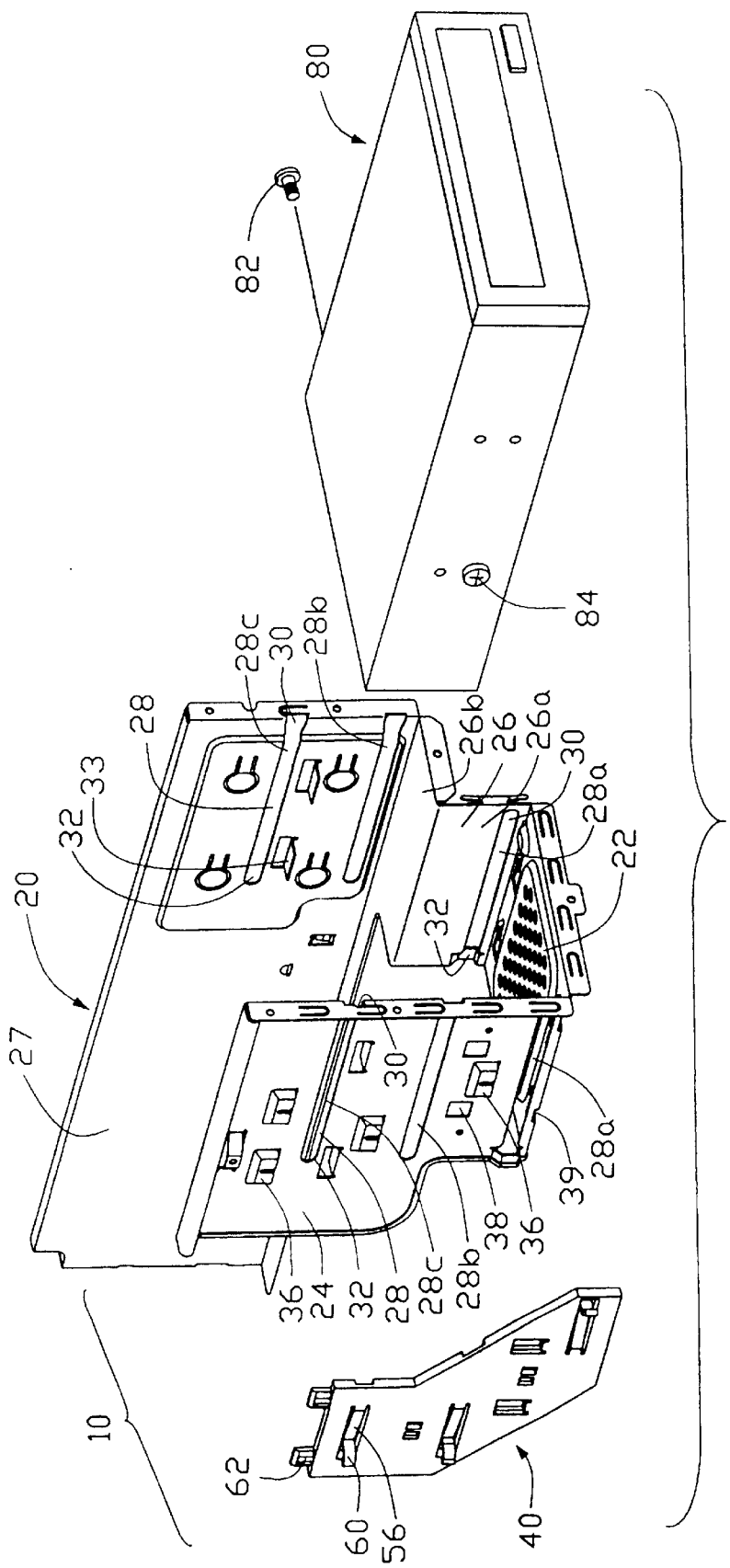
FIG. 1 is an exploded view of a fixing apparatus in accordance with a preferred embodiment of the present invention, together with a data storage device.

Referring to the attached drawings, FIG. 1 shows a fixing apparatus 10 in accordance with a preferred embodiment of the present invention, together with a data storage device 80. The fixing apparatus 10 comprises a drive bracket 20 and a fixing plate 40. The data storage device 80 may be a CD-ROM drive, a hard disk drive, a floppy disk drive, and so on. For convenience, the data storage device 80 is hereinafter designated as a CD-ROM drive 80. A pair of screws 82 is threadedly engaged on opposite sides of the CD-ROM drive 80 respectively. Each screw 82 has a screw cap 84.

The drive bracket 20 comprises a bottom panel 22, a first side panel 24, a step 26, and a second side panel 27. The first side panel 24 extends perpendicularly upwardly from a side edge of the bottom panel 22. The step 26 comprises a vertical plate 26a extending perpendicularly upwardly from an opposite side edge of the bottom panel 22, and a horizontal plate 26b extending horizontally outwardly from a top edge of the vertical plate 26a. The second side panel 27 extends perpendicularly upwardly from a free edge of the horizontal plate 26b of the step 26. Three pairs of parallel grooves 28 are defined in the drive bracket 20, each pair of grooves 28 being for guiding the CD-ROM drive 80 or another data storage device into the drive bracket 20. A pair of bottom grooves 28a is respectively defined in the first side panel 24 and the vertical plate 26a of the step 26, slightly above the bottom panel 22. A pair of middle grooves 28b is respectively defined in the first side panel 24, and in a bottom portion of the second side panel 27 slightly above the horizontal plate 26b of the step 26. A pair of top grooves 28c is respectively defined in the first side panel 24 and a middle portion of the second side panel 27. Each groove 28 comprises a rear portion 32, and a front widened portion 30 for facilitating sliding entry of the screw cap 84 of the corresponding screw 82 of the CD-ROM drive 80. Each first and second side panel 24, 27 is stamped inwardly to form a pair of support tabs 33 below the top grooves 28c, for supporting the CD-ROM drive 80. The first side panel 24 is stamped outwardly to form a plurality of retaining protrusions 36. A pair of cutouts 38 is defined in the first side panel 24, below the groove 28b and on opposite sides of one retaining protrusion 36 respectively. A pair of retaining apertures 39 is defined in a junction of the first side panel 24 and the bottom panel 22.

Figure 2:
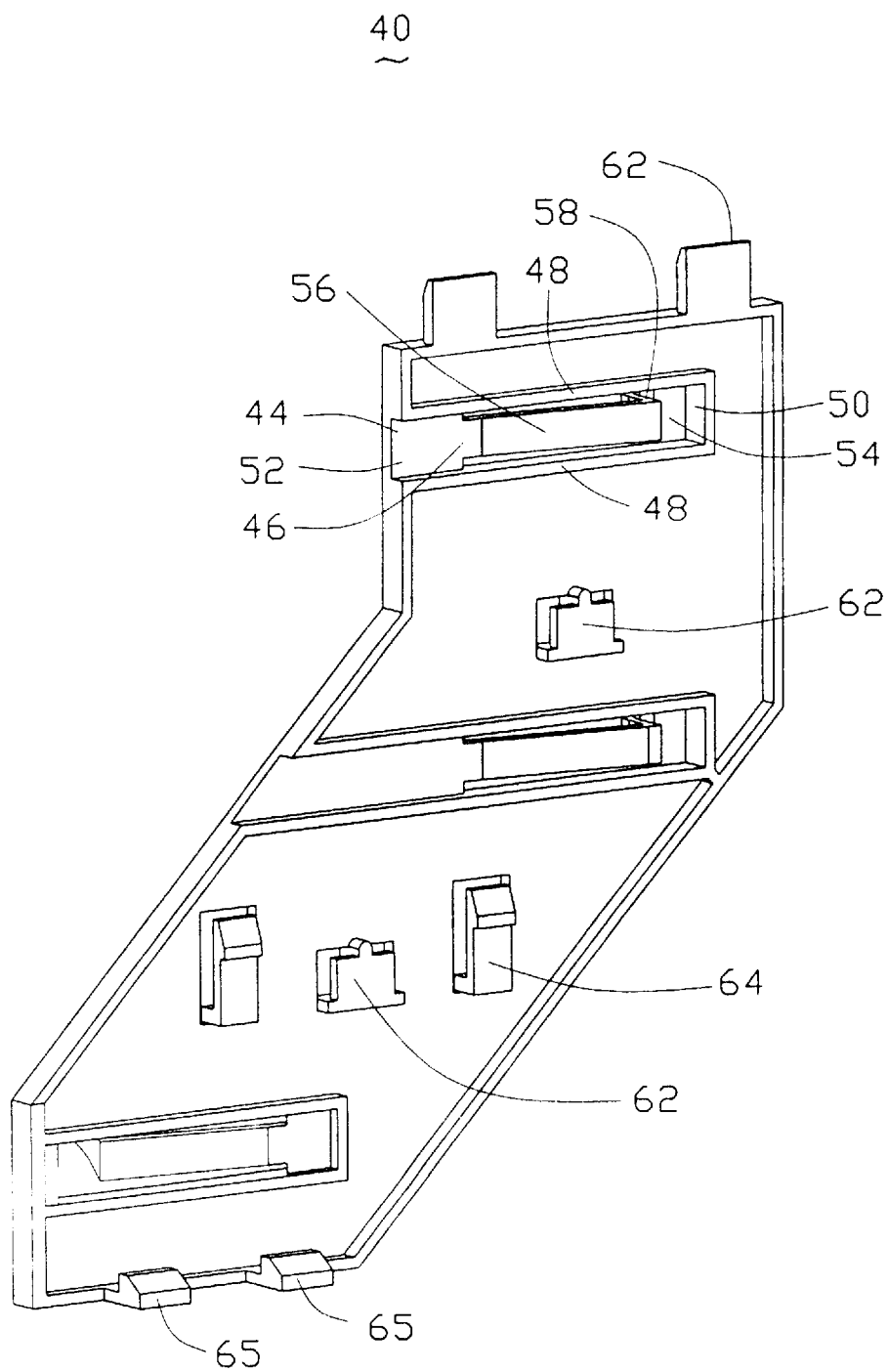
FIG. 2 is a perspective view of a fixing plate of the fixing apparatus of FIG. 1.

Referring also to FIG. 2, the fixing plate 40 is made of plastic material. The fixing plate 40 comprises three locking elements 44 corresponding to the grooves 28 of the first side panel 24. Each locking element 44 comprises an outside wall 46, a pair of top and bottom walls 48 respectively extending inwardly from opposite top and bottom edges of the outside wall 46, and a rear wall 50 connecting the top and bottom walls 48. An entry 52 is defined at a front end of the locking element 44 that is opposite to the rear wall 50. An opening 54 is defined in the outside wall 46 between the entry 52 and the rear wall 50. A bent spring portion 56 extends rearwardly and slightly inwardly from a rear edge of the outside wall 46 toward the rear wall 50 via the opening 54. A stop wall 58 extends perpendicularly outwardly from a free end of the spring portion 56. An arcuate handle 60 (see FIG. 1) extends outwardly and rearwardly from a free end of the stop wall 58. A plurality of hooks 62 is formed on the fixing plate 40, corresponding to the retaining protrusions 36 of the first side panel 24. A pair of inwardly extending vertical barbs 64 is formed on the fixing plate 40, corresponding to the cutouts 38 of the first side panel 24. A pair of inwardly extending horizontal barbs 65 is formed at a bottom of the fixing plate 40, corresponding to the retaining apertures 39 of the drive bracket 20.

Figure 3:
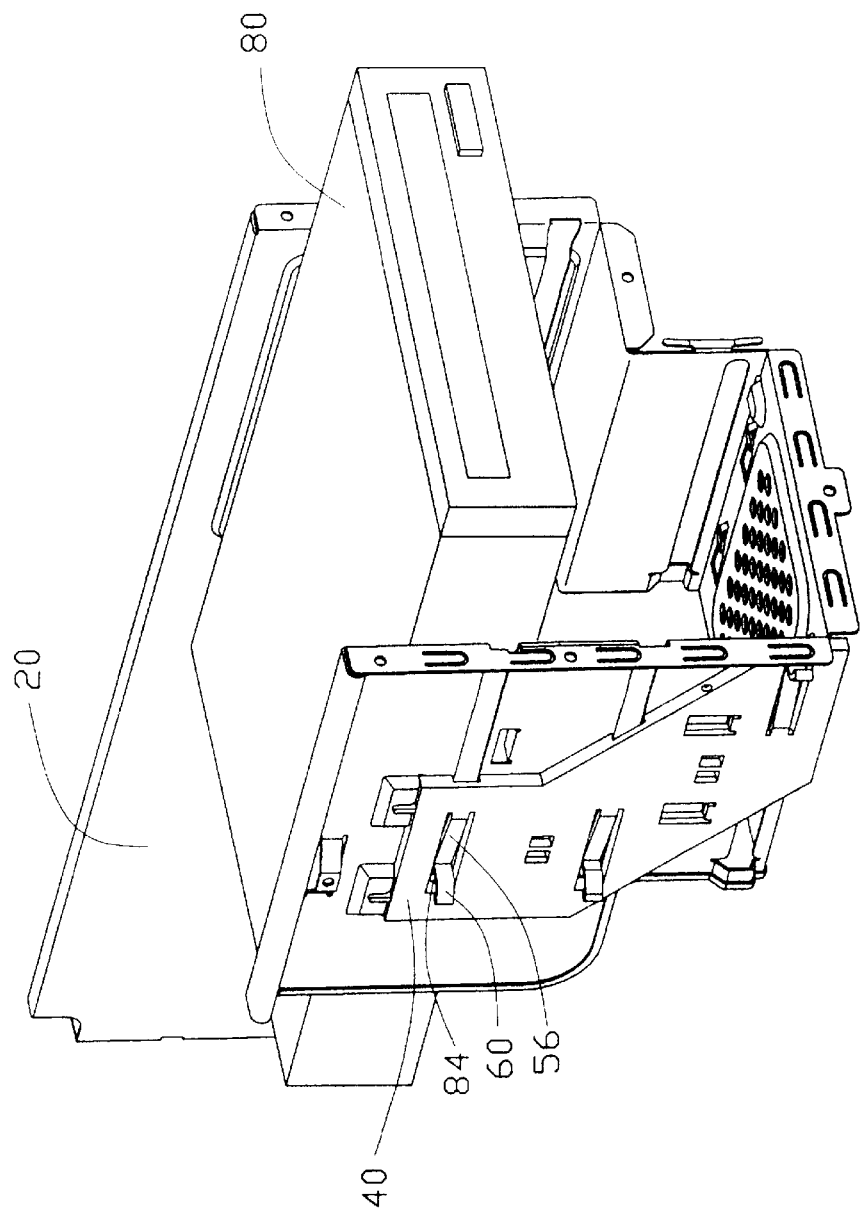
FIG. 3 is a fully assembled view of FIG. 1.

Referring also to FIG. 3, in assembly, the fixing plate 40 is attached on the first side panel 24 of the drive bracket 20. The hooks 62 of the fixing plate 40 are engaged with the retaining protrusions 36 of the first side panel 24. The vertical barbs 64 and horizontal barbs 65 of the fixing plate 40 are respectively engaged in the cutouts 38 and retaining apertures 39 of the first side panel 24.

In use, the CD-ROM drive 80 is slid into the drive bracket 20. The screw caps 84 of the CD-ROM drive 80 respectively enter the top grooves 28c of the drive bracket 20 via the front widened portions 30. One screw cap 84 enters the entry 52 of the fixing plate 40 to slide into the locking element 44. The said one screw cap 84 outwardly presses the spring portion 56 of the locking element 44, causing the spring portion 56 to be elastically deformed. When the screw caps 84 arrive in the rear portions 32 of the top grooves 28c, the said one screw cap 84 has slid beyond the spring portion 56, and the spring portion 56 elastically returns to its original position. The said one screw cap 84 is thus sandwiched between the stop wall 58 of the locking element 44 and the first side panel 24 of the drive bracket 20. The CD-ROM drive 80 is supported on the support tabs 33. The CD-ROM drive 80 is thus securely attached within the drive bracket 20. Similarly, the CD-ROM drive 80 or another data storage device can be received between the pair of middle grooves 28b and supported on the step 26, or received between the pair of bottom grooves 28a and supported on the bottom panel 22.

In removing the CD-ROM drive 80, the handle 60 of the fixing plate 40 is pulled outwardly. The said one screw cap 84 is thus released from the stop wall 58 of the locking element 44. The CD-ROM drive 80 is then readily slid out from the drive bracket 20.

Figure 4:
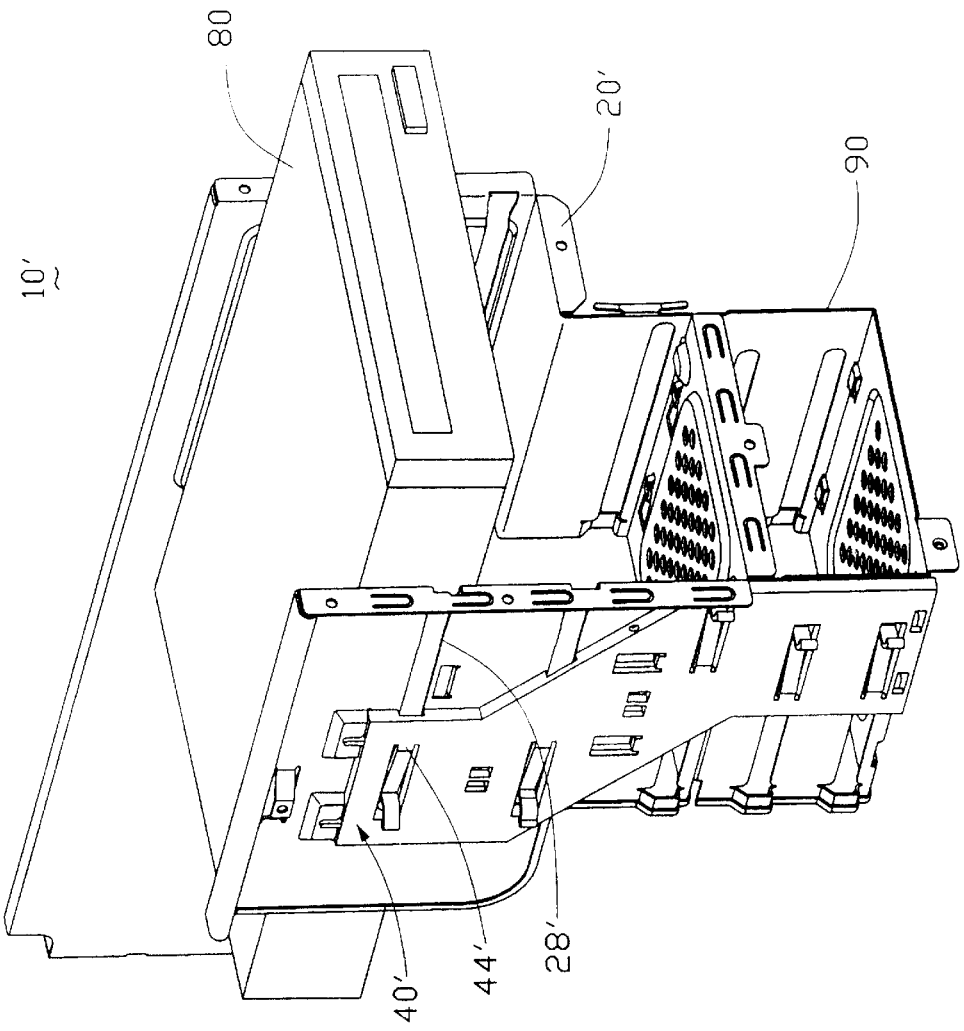
FIG. 4 is a fully assembled view of a fixing apparatus in accordance with an alternative embodiment of the present invention and a data storage device.

FIG. 4 shows a fixing apparatus 10' in accordance with an alternative embodiment of the present invention. The fixing apparatus 10' comprises a large drive bracket 20', a small drive bracket 90 attached to an underside of the large drive bracket 20', and a fixing plate 40' attached on one side of the combined large and small drive brackets 20', 90. The large drive bracket 20' is similar to the drive bracket 20 of the preferred embodiment. The fixing plate 40' is similar to the fixing plate 40 of the preferred embodiment. The large and small drive brackets 20', 90 define a total of five pairs of parallel grooves 28' therein. The fixing plate 40' forms five locking elements 44', corresponding to five grooves 28' of one side of the combined large and small drive brackets 20', 90. The locking elements 44' are similar to the locking elements 44 of the preferred embodiment. Assembly and use of the fixing apparatus 10', and removal of the CD-ROM drive 80 or another data storage device from the fixing apparatus 10', are all performed similarly to the corresponding procedures described above in relation to the fixing apparatus 10 of the preferred embodiment.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A fixing apparatus for storage devices, the fixing apparatus comprising:

at least one drive bracket for installing the storage devices therein, the at least one drive bracket comprising a first side panel defining a plurality of grooves for slidingly receiving screws attached on sides of the storage devices and thereby guiding the storage devices into the at least one drive bracket; and a fixing plate attached on the first side panel, the fixing plate having a plurality of locking elements corresponding to the grooves, each locking element comprising a spring portion and a stop wall, wherein when one of the screws of each storage device is slid in a corresponding groove, the said one of the screws presses a corresponding spring portion outwardly to cause the corresponding spring portion to elastically deform until the said one of the screws has slid past the corresponding spring portion to be sandwiched between a corresponding stop wall and the first side panel, thereby securing each storage device within the at least one drive bracket.

2. The fixing apparatus as claimed in claim 1, wherein each locking element further comprises an entry and a handle, the spring portion extends rearwardly from the entry, and the stop wall extends outwardly from a free end of the spring portion, and wherein when the handle is pulled outwardly, the said one of the screws is released from the corresponding stop wall to thereby allow disengagement of the storage device from the at least one drive bracket.

3. The fixing apparatus as claimed in claim 2, wherein each locking element further comprises a pair of top and bottom walls and a rear wall connecting between the top and bottom walls, and wherein the entry, the spring portion and the stop wall are located between the top and bottom walls.

4. The fixing apparatus as claimed in claim 1, wherein the at least one drive bracket further comprises a bottom panel, the first side panel extends from one side edge of the bottom panel, a step extends from an opposite side edge of the bottom panel, a second side panel extends upwardly from the step, and the step and the second side panel define grooves corresponding to the grooves of the first side panel respectively.

5. The fixing apparatus as claimed in claim 4, wherein the step comprises a vertical plate defining a groove corresponding to a groove in the first side panel, and a horizontal plate for supporting one of the storage devices thereon.

6. The fixing apparatus as claimed in claim 4, wherein the first and second side panels each form a support tab below a groove thereof, for supporting one of the storage devices thereon.

7. The fixing apparatus as claimed in claim 4, wherein the at least one drive bracket defines a retaining aperture in a junction of the first side panel and the bottom panel, and the fixing plate forms a horizontal barb engaging in the retaining aperture.

8. The fixing apparatus as claimed in claim 1, wherein the first side panel is stamped outwardly to form at least one retaining protrusion, and the fixing plate forms at least one hook engaged with the at least one retaining protrusion.

9. The fixing apparatus as claimed in claim 8, wherein the first side panel further defines a cutout, and the fixing plate forms a barb engaged in the cutout.

10. The fixing apparatus as claimed in claim 1, wherein each groove comprises a front widened portion for facilitating sliding of the storage device into the at least one drive bracket.

11. The fixing apparatus as claimed in claim 1, wherein the at least one drive bracket comprises a large drive bracket and a small drive bracket, and the small drive bracket is attached below the large drive bracket.

12. A fixing apparatus assembly comprising:

at least one storage device having a pair of screws attached on opposite sides thereof, each screw comprising a screw cap; and a fixing apparatus comprising:

at least one drive bracket receiving the at least one storage device therein, the at least one drive bracket comprising a pair of side panels each defining at least one groove to allow the screw caps to slide therein and thereby guide the at least one storage device into the at least one drive bracket;

a fixing plate attached to one side panel, the fixing plate forming at least one locking element corresponding to the at least one groove defined in said one side panel, the at least one locking element comprising a stop wall and a handle, wherein when the at least one storage device has been guided into the at least one drive bracket, the stop wall sandwiches a corresponding screw cap with the said one side panel to thereby secure the at least one storage device in the at least one drive bracket, and when the handle is pulled away from the at least one drive bracket, the corresponding screw cap is released from the stop wall to thereby allow disengagement of the at least one storage device from the at least one drive bracket.

13. The fixing apparatus assembly as claimed in claim 12, wherein the at least one locking element further comprises an entry and a spring portion extending rearwardly away from the entry, the stop wall extends outwardly from a free end of the spring portion, and the handle extends outwardly and rearwardly from the stop wall.

14. The fixing apparatus assembly as claimed in claim 13, wherein the at least one locking element further comprises a pair of top and bottom walls and a side wall connected with the top and bottom walls, and wherein the entry, the spring portion and the stop wall are located between the top and bottom walls.

15. The fixing apparatus assembly as claimed in claim 12, wherein the at least one drive bracket further comprises a bottom panel for supporting a storage device, and a step is connected between the bottom panel and the other side panel for supporting another storage device.

16. The fixing apparatus assembly as claimed in claim 12, wherein the first and second side panels each form a support tab below a groove thereof, for supporting the at least one storage device thereon.

17. The fixing apparatus assembly as claimed in claim 12, wherein the at least one drive bracket comprises a large drive bracket and a small drive bracket, and the small drive bracket is attached below the large drive bracket.

\* \* \* \* \*